Figure 1:
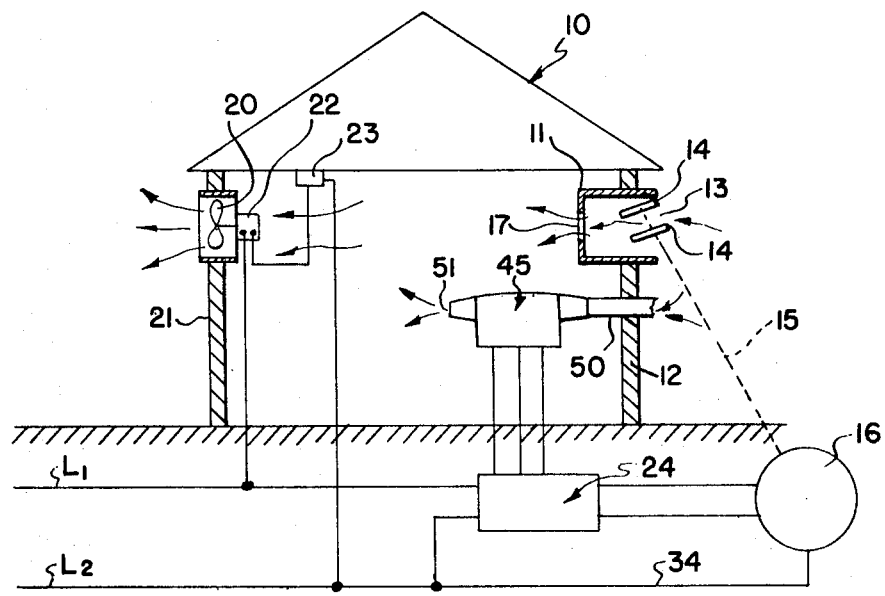

United States Patent

[11] 3,611,906

| [72] | Inventor | Jerome L. Lorenz<br>Columbus, Ohio |
|---|---|---|
| [21] | Appl. No. | 844,584 |
| [22] | Filed | July 24, 1969 |
| [45] | Patented | Oct. 12, 1971 |
| [73] | Assignee | Ranco Incorporated<br>Columbus, Ohio |

[54] VENTILATING SYSTEM AND CONTROL THEREFOR
8 Claims, 2 Drawing Figs.

[52] U.S. Cl. ................................................. 98/33 R,
236/49
[51] Int. Cl. ...................................................... F24f 13/00
[50] Field of Search ............................................ 98/33, 1.5;
236/49; 62/186

[56] References Cited
UNITED STATES PATENTS

| 3,211,075 | 10/1965 | Robson | 98/33 X |
| 3,352,225 | 11/1967 | Ffiske | 98/33 |

Primary Examiner—Meyer Perlin
Attorney—Watts, Hoffmann, Fisher & Heinke

ABSTRACT: Dampers in the air inlet of a ventilation system for a relatively closed room or building are adjustably positioned by a reversible electric motor controlled so that although the velocity at which air is exhausted from the building may vary, the dampers regulate the inflow of air to provide a substantially constant pressure differential between the interior and exterior of the building.

PATENTED OCT 12 1971 3,611,906

INVENTOR
JEROME L. LORENZ
BY
Watts, Hoffmann, Fisher & Heinke
ATTORNEYS

VENTILATING SYSTEM AND CONTROL THEREFOR

BACKGROUND OF THE INVENTION

In certain buildings, such as animal barns and poultry houses, it is important to maintain uniform ventilation and temperatures throughout the building. It is the practice to maintain such buildings as airtight as practical and to provide a ventilation system in which air is drawn into the building through a damper-controlled inlet, circulated throughout the building and then exhausted by a fan or blower. The dampers are preferably set so that a given air pressure differential is maintained between the inside of the building and atmosphere so as to assure uniform circulation of air throughout the building. It has been found desirable to vary the exhaust fan speed in accordance with temperature variations inside the building and thereby maintain a more or less uniform temperature. These fan speed variations change the pressure differential between the interior of the building and atmosphere and adversely affect air distribution throughout the building.

THE PRESENT INVENTION

A principal object of the present invention is the provision of a new and improved ventilation system for a building or the like in which air may be drawn into and discharged from the building at variable rates and in which a given differential in air pressure between the interior of the building and atmosphere is automatically maintained throughout variations in air discharge rate.

A more specific object of the present invention is the provision of a new and improved control system for maintaining a given pressure differential between air inside a building or the like and atmosphere by regulating the intake of air into the ventilation system of the building in accordance with the rate of flow of a stream of air induced by the pressure differential.

Figure 2:
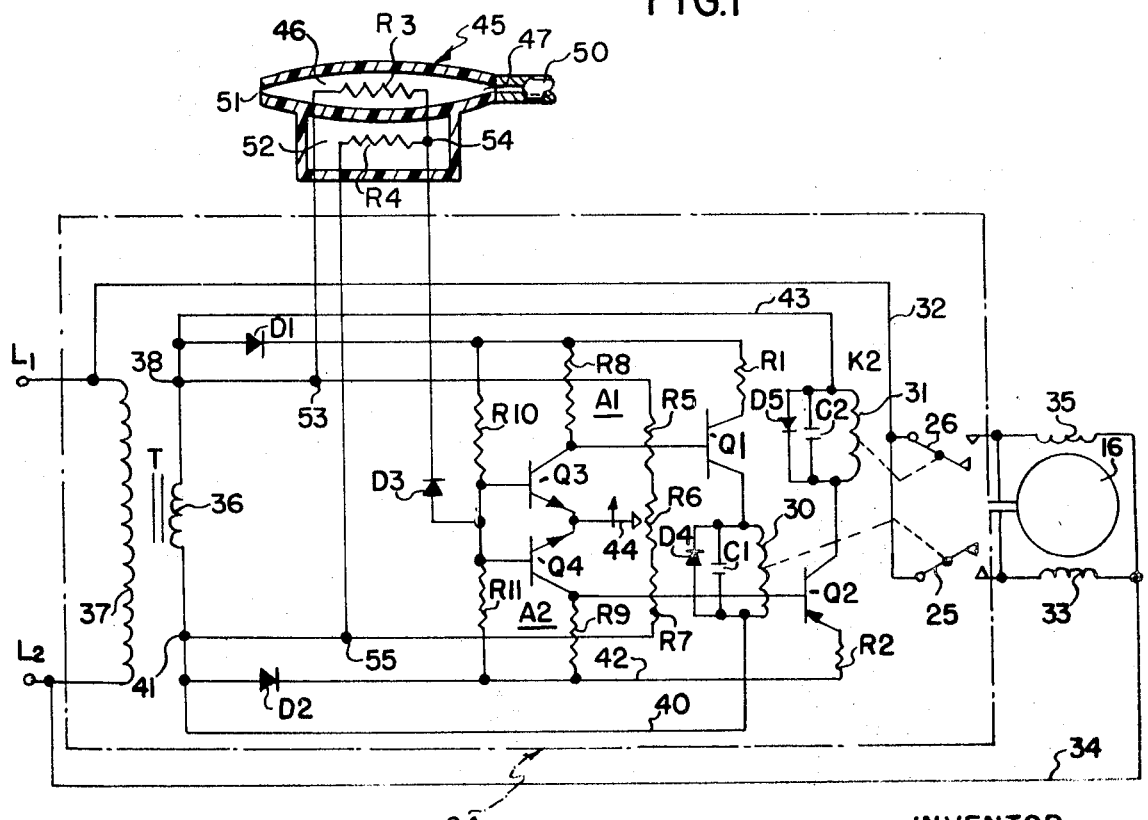

Other objects and advantages of the invention will be apparent from the following description of a preferred form thereof, reference being made to the accompanying drawings wherein:

FIG. 1 is a schematic view of an animal barn having a ventilation system embodying the invention; and FIG. 2 is a wiring diagram of a control circuit for the ventilating system.

Referring to the drawings, an animal barn 10 is shown which includes a forced-air ventilating system arranged to provide uniform ventilation throughout the building. For sake of simplicity, the system is shown as comprising a boxlike air distribution plenum chamber 11, which is installed in an opening through a wall 12 of the building. The chamber 11 has an air inlet 13 which is open to the atmosphere, and the flow of air through the inlet is regulated by adjustable louvers or dampers 14. The dampers 14 are supported in the inlet in a conventional manner on pivots and their angular positions can be adjusted to modulate the effective area of the air inlet opening 13. The dampers 14 are moved about their pivots by a shaft 15 rotated by a reversible electric motor 16. The shaft 15 is driven through suitable reduction gears, not shown, so that the movement of the dampers is relatively slow. The plenum chamber has outlets through which air passes into the interior of the barn. In practice a number of air distribution ducts may be employed, and for simplicity of description, only one outlet 17 is shown.

Air is drawn into the barn through the plenum chamber 11 by an electric-motor-driven fan 20 which is located in an opening in a wall 21 of the barn so as to forcibly exhaust air from the barn. The fan 20 is driven by an electric motor 22, the speed of which is controlled by a thermostatic speed regulator 23. The regulator 23 may be of any conventional design and increases and decreases the speed of the fan motor in response to increases and decreases, respectively, in temperature of the air in the barn from a predetermined degree. Electric power is supplied to the motor 22 through conventional powerlines L1,L2 as shown in the drawing.

It will be appreciated that when the exhaust fan 20 is operating the pressure inside the barn will be reduced relative to atmospheric pressure. The amount of reduction of this pressure inside the barn will depend upon the speed of the fan and the degree of restriction imposed by the dampers 14 to the inflow of air into the plenum chamber 11. The design and configuration of the ventilating system are such that uniform distribution of air throughout the barn is best effected when a predetermined pressure differential exists between the inside and outside of the barn.

In accordance with the present invention a control apparatus 24 is provided whereby the positions of the dampers 14 are automatically regulated by the motor 16 so as to maintain the desired predetermined pressure differential mentioned irrespective of variations in speed of the fan 20. When the pressure differential tends to decrease from the desired value the motor 16 is driven in a direction to adjust the dampers 14 to impose greater restriction to the flow of air into the ventilating system, thereby reestablishing the desired pressure differential. Should the pressure differential increase, the motor 16 is operated in the opposite direction to move the dampers 14 to a position permitting freer inflow of air thereby reestablishing the desired pressure differential.

The direction of rotation of the motor 16 for positioning the dampers 14 as described is controlled by an apparatus 24.

Referring more particularly to FIG. 2, the control apparatus 24 includes two normally open relay switches 25 and 26 which control operation of the motor 16 in opposite directions. The switch 25 is closed upon energization of a solenoid 30 and the switch 26 is closed upon energization of a solenoid 31. One terminal of switch 25 is connected by a wire 32 to line L1 of a conventional two-wire 120-v. AC power system. The other terminal of the switch 25 is connected to a winding 33 of the motor 16, and by a wire 34 to line L2 of the power system. When switch 25 is closed winding 33 is energized and causes motor 16 to rotate in a direction to move the dampers 14 towards a position to increase the opening of the air inlet of the plenum chamber 11.

One terminal of switch 26 is connected to the wire 32 and the other terminal is connected to a winding 35 of the motor 16 which winding is connected by wire 34 to line L2. Closure of switch 26 energizes motor winding 35 to drive the motor 16 in a direction to move the dampers 14 towards closing the air inlet of the plenum chamber 11.

The solenoids 30,31 are energized by current supplied by the secondary winding 36 of a stepdown transformer T, the primary winding 37 of which is connected with lines L1,L2. The transformer reduces the voltage to a Class II level. One terminal of the solenoid 30 is connected with the secondary terminal 38 of the winding 36 through a circuit including a diode D1, a resistor R1 and a transistor Q1. The other terminal of the solenoid 30 is connected by wire 40 to terminal 41 of the secondary winding 36.

The solenoid coil 31 is energized by a circuit which includes terminal 41 of the secondary winding 36, diode D2, wire 42, resistor R2, transistor Q2, solenoid coil 31 and wire 43 to terminal 38 of the secondary winding.

The flow of current through solenoid coil 30 is controlled by the transistor Q1 which comprises the output of amplifier A1 which is energized during the positive half cycle of the alternating current induced in the winding 36. That is to say, during the half-cycle when the voltage at terminal 38 is positive relative to terminal 41. The transistor Q2 comprises the output of a second amplifier A2 which is energized by the negative half-wave of the alternating current induced in the winding 36. That is to say, when the voltage at terminal 41 is positive relative to the voltage at terminal 38.

The amplifiers respond to differences in voltages at the junction of a voltage divider formed by two temperature-responsive resistors R3, R4 and the voltage at the junction of a reference voltage divider formed by resistors R5, R6, R7. The resistor R6 is a potentiometer including a slider 44 which may be positioned by an adjusting knob, not shown. The voltage dividers comprise a Wheatstone bridge described more fully hereinafter.

The resistors R3 and R4 are positive temperature coefficient types and operate at a self-heating wattage level. The resistors R3,R4 are located in a casing 45 which includes a tubular portion 46 in which the resistor R3 is positioned. One end 47 of the passage 46 is connected by a tube 50 with the exterior of the barn 10 and the opposite end 51 of the passage is open to the interior of the barn. When the fan 20 is operating to exhaust air from the interior of the barn a stream of air flows through the passage 46 and over the resistor R3 at a velocity which is a function of the pressure difference between the interior and exterior of the barn. This flow of air removes heat from the resistor R3 and consequently its temperature and resistance will reflect the rate of airflow thereover.

It will be understood that the diameter of the passage 46 is in the order of one-fourth of an inch and the the volume of air passing therethrough is miniscule as compared with the volume of air entering the barn through the plenum chamber 11.

The resistor R4 is identical to the resistor R3 and is located in a closed compartment 52 of the casing 45. The resistor R4 is subject to the same ambient temperatures as is the resistor R3 but the heat generated therein is dispersed at a substantially slower rate. Accordingly, difference in resistance of R3 and R4 will occur when air flows over R3 and the degree of difference is indicative of the airflow rate.

Preferably, the casing 45 is located inside the barn 10 adjacent the plenum chamber 11, although it could be installed in any convenient location.

One terminal of the resistor R3 is connected with the terminal 38 of the secondary winding 36 through a junction 53 and a resistor R8. The other terminal of the resistor R3 is connected to a junction 54.

One terminal of resistor R4 is connected with the terminal 41 of the secondary winding 36 through a circuit including junction 55. The other terminal of resistor R4 is connected to the junction 54.

The amplifier A1 includes a transistor Q3 arranged to forward bias the transistor Q1. The collector of the transistor Q3 is connected with the terminal 38 through a resistor R8 and diode D1. The emitter of transistor Q3 is connected to the slider 44 of the potentiometer R6. As mentioned previously, the resistors R5, R6, R7 form a voltage divider and the resistors are connected in circuit between the transformer terminals 38,41. The base of the transistor Q3 is connected in circuit with the junction 54 through a diode D3.

The amplifier A2 includes a transistor Q4 arranged to forward bias the transistor Q2. The collector of transistor Q4 is connected with terminal 41 through a resistor R9 and diode D2, and the emitter is connected to the slider 44 of the potentiometer R6. The base of the transistor Q4 is connected with the junction 54 through the diode D3.

Resistors R10,R11 are connected between the diode D1 and the base of Q3, and diode D2 and the base of Q4. These resistors and the diodes D3,D4 provide voltage and temperature change compensation for the emitter-base voltage drop of Q3,Q4, and also eliminate bridge offset voltage.

It will be observed that the transistor Q3 is oriented in the circuit so it is conductive only during the positive cycle.

When the fan 20 is operating and the pressure differential between the interior and exterior of the barn 16 is at the desired value, the airflow through the passage 46 maintains the temperature of resistor R3 somewhat below that of R4. When the voltage at junction 54 is substantially the same as the voltage at junction 44 neither of the transistors Q3 or Q4 will be forward biased and the switches 25,26 remain open.

In the event that the pressure differential increases between the interior and exterior of the barn, the rate of flow of air through passage 46 increases which lowers the temperature of resistor R3 and reduces the resistance thereof. When this occurs, the voltage at 54 increases during each positive half cycle which turns on transistor Q3 causing transistor Q1 to conduct and energize the solenoid 30 for closing switch 25. The motor 16 is then driven in a direction to move the dampers 14 to further open the inlet opening 13. This permits a freer flow of air into the barn and consequently reduces the pressure differential between the interior and exterior of the barn. The reduction in pressure differential reduces the flow of air over the resistor R3 causing an increase in resistance and a reduction in voltage at the junction 54. When the voltage at junction 54 substantially matches that of the slider 44, transistor Q3 turns off and the solenoid 30 is deenergized which opens switch 25. The motor 16 is stopped and the dampers 14 remain in their newly adjusted position.

In the event that the pressure differential between the interior and exterior of the barn decreases, the flow of air through passage 46 likewise decreases. The heat generated by resistance R3 builds up the temperature of R3 which increases its resistance and produces an increase in the voltage at junction 54 during the negative half cycles. The transistor Q4 is therefore rendered conductive and turns on transistor Q2. Conduction through Q2 energizes the solenoid 31 which closes switch 26 causing the motor 16 to rotate in a direction to move the dampers 14 toward their air-inlet-closing position. Closing dampers 14 results in an increase in pressure differential between the interior and exterior of the barn and induces a more rapid flow of air over the transistor R3. This reduces the voltage at 54 and turns off the transistors Q4,Q2 when the voltages at junctions 44, 54 approach a balance. The motor 16 is then deenergized by opening of the solenoid switch 26.

The pull-in voltages of the solenoids 30,31 are such that the switches 25 and 26 remain open during slight variations of the voltage signals at 54 and 44. Condensers C1,C2 are connected in parallel with the solenoid coils 30,31 respectively to prevent chatter of the solenoid relay. The diodes D4,D5 are connected across the condensers C1,C2, respectively, to prevent back bias of the condensers.

It will be seen that by adjusting the slider 44, a different reference voltage may be established which will provide a different air pressure differential between the interior and exterior of the barn.

I claim:

1. A building having a ventilation system comprising means forming a ventilating air inlet and distributing duct and an air exhaust outlet for said building, means forcing air into said distributing duct and out of said exhaust outlet, first control means for varying the rate of airflow through said ventilating system, and second control means for varying the rate of flow through said ventilating system, said first means being responsive to a change in the air pressure differential between the interior and exterior of said building from a given differential to vary said rate of flow.

2. A building as defined in claim 1 further characterized by said first means being responsive to an increase in said air pressure differential to increase said rate of airflow and responsive to a decrease in said air differential to decrease said rate of airflow.

3. A building as defined in claim 1 further characterized by said second means being responsive to increases and decreases in temperature from a given value to increase and decrease, respectively, the rate of flow of air.

4. A building as defined in claim 1 in which said first means comprises variable dampers in said ventilating system and said second means comprises an air blower in said ventilating system.

5. In a ventilating system as defined in claim 1 further characterized by said first control means comprising an air passage between the interior and exterior of said building and having a relatively fixed airflow opening therethrough, and means in the last mentioned passage responsive to changes in the rate of flow of air through the last-mentioned passage.

6. In a ventilating system for a building and comprising means to vary the rate of air exiting said building including duct means forming an air passage from the outside to the inside of said building, damper means operative to control the flow of air through said duct means, and means to control operation of said damper means comprising means forming a second air passage between the interior and exterior of the building having a relatively fixed airflow opening, and means including an element in said second passage responding to changes in the rate of flow of air therethrough for controlling said damper means.

7. In a ventilating system as defined in claim 6 further characterized by said means to control the rate of flow of air comprising adjustable damper means in said duct means.

8. In a ventilating system as defined in claim 6 further characterized by said element of the last-mentioned means including an electric resistor in said second passage, a second resistor like the first resistor and shielded from the passage of air, and means responsive to differences in resistance of said two resistors for controlling the position of said damper means.